(12) United States Patent
Adamson et al.

(10) Patent No.: US 10,585,721 B2
(45) Date of Patent: Mar. 10, 2020

(54) MULTIMODAL INTERFACE

(71) Applicant: Intel Corporation, Santa Clara, CA (US)

(72) Inventors: Peter S. Adamson, Portland, OR (US); Nivedita Aggarwal, Bangalore (IN); Karunakara Kotary, Portland, OR (US); Abdul Rahman Ismail, Beaverton, OR (US); Tin-Cheung Kung, Folsom, CA (US); David T. Hines, Cameron Park, CA (US); Chia-Hung Sophia Kuo, Folsom, CA (US); Ajay V. Bhatt, Portland, OR (US); Karthi R. Vadivelu, Folsom, CA (US); Prashant Sethi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 15/558,116

(22) PCT Filed: Mar. 21, 2016

(86) PCT No.: PCT/US2016/023342
§ 371 (c)(1),
(2) Date: Sep. 13, 2017

(87) PCT Pub. No.: WO2016/171822
PCT Pub. Date: Oct. 27, 2016

(65) Prior Publication Data
US 2018/0046522 A1  Feb. 15, 2018

(30) Foreign Application Priority Data

Apr. 18, 2015 (IN) .......................... 2004/CHE/2015

(51) Int. Cl.
*G06F 9/54* (2006.01)

(52) U.S. Cl.
CPC ............... *G06F 9/541* (2013.01); *G06F 9/54* (2013.01); *G06F 9/544* (2013.01)

(58) Field of Classification Search
None
See application file for complete search history.

(56) References Cited

U.S. PATENT DOCUMENTS

2005/0105531 A1* 5/2005 Zur .................. H04L 69/32
370/395.5
2007/0067539 A1* 3/2007 Morrow ............. G06F 13/4239
710/305

(Continued)

FOREIGN PATENT DOCUMENTS

WO  2014051651 A1  4/2014

OTHER PUBLICATIONS

Notification Transmittal of International Preliminary Report on Patentability issued in PCT Application No. PCT/US2016/023342 dated Nov. 2, 2017, 8 pages.

(Continued)

*Primary Examiner* — Shih-Wei Kraft
(74) *Attorney, Agent, or Firm* — Patent Capital Group

(57) ABSTRACT

Particular embodiments described herein provide for an electronic device that can receive data from an operating system in an electronic device, where the data is related to hardware that is in communication with the electronic device through a multimodal interface and communicate the data and/or related data to a local policy manager, where the local policy manager is in communication with the multimodal interface. The multimodal interface can be configured to support power transfers, directionality, and multiple input/output (I/O) protocols on the same interface.

12 Claims, 13 Drawing Sheets

(56) References Cited

U.S. PATENT DOCUMENTS

| | | | |
|---|---|---|---|
| 2007/0210174 A1* | 9/2007 | Deprun | G06K 7/0008 |
| | | | 235/492 |
| 2008/0005380 A1 | 1/2008 | Kawasaki et al. | |
| 2008/0270599 A1* | 10/2008 | Tamir | H04L 41/0803 |
| | | | 709/224 |
| 2009/0007153 A1 | 1/2009 | Mysore et al. | |
| 2009/0319918 A1 | 12/2009 | Affronti et al. | |
| 2010/0011128 A1* | 1/2010 | Paycher | G06F 13/102 |
| | | | 710/1 |
| 2010/0290467 A1* | 11/2010 | Eisenhauer | H04L 41/00 |
| | | | 370/392 |
| 2010/0299517 A1* | 11/2010 | Jukic | H04L 12/2809 |
| | | | 713/150 |
| 2013/0074067 A1 | 3/2013 | Chowdhry | |
| 2013/0124076 A1 | 5/2013 | Bruni et al. | |
| 2013/0246778 A1 | 9/2013 | Nikara et al. | |
| 2013/0315256 A1* | 11/2013 | Balakavi | H04L 49/602 |
| | | | 370/401 |
| 2016/0077843 A1* | 3/2016 | Jakoboski | G06F 1/266 |
| | | | 710/8 |

OTHER PUBLICATIONS

International Search Report and Written Opinion issued in PCT Application No. PCT/US2016/023342 dated Jul. 19, 2016; 9 pages.
Extended European Search Report issued in EP Application No. 16/783 550.3 dated Nov. 14, 2018; 9 pages.

\* cited by examiner

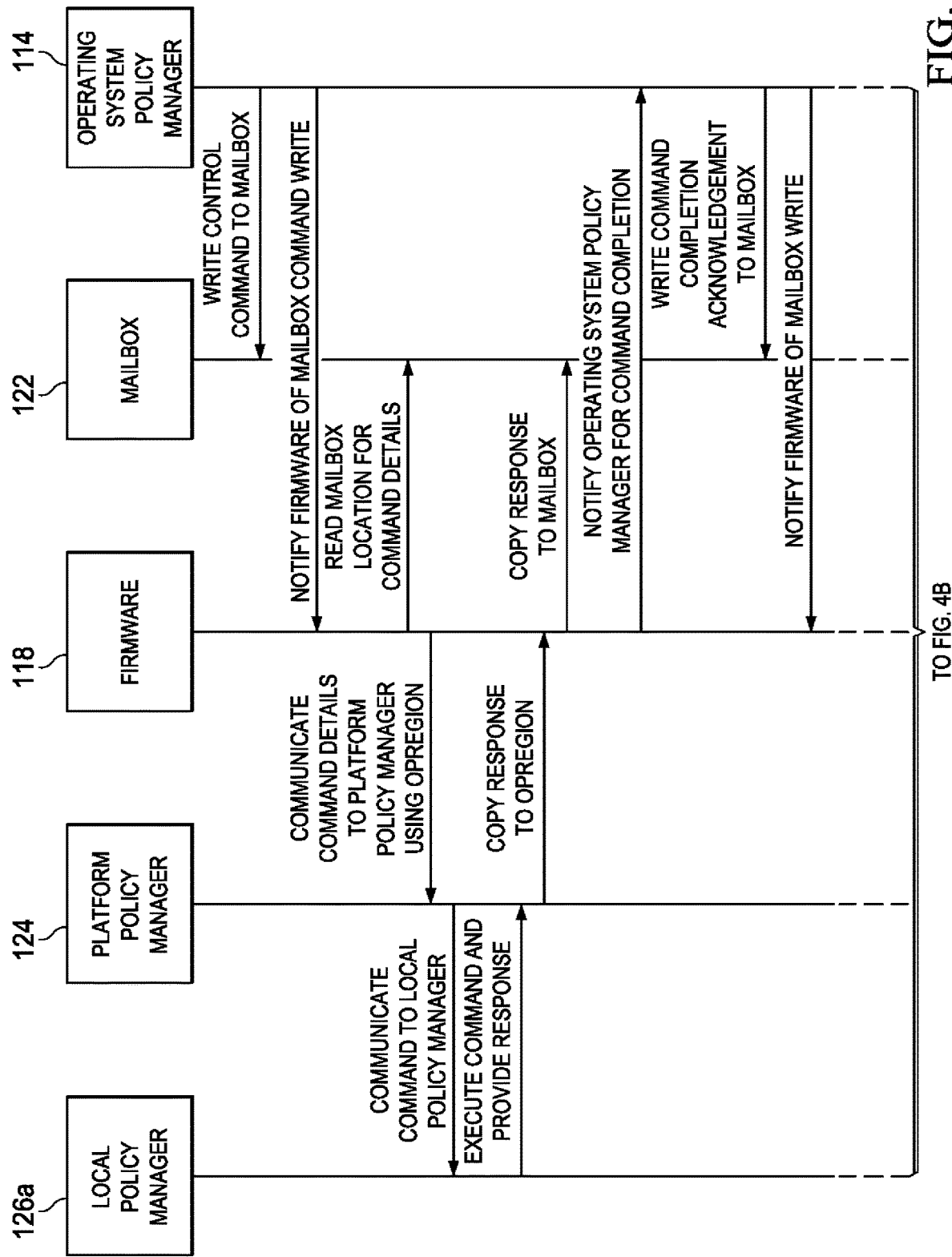

| OFFSET (BYTES) | NAME | MEMORY LOCATION | DIRECTION | SIZE (BITS) |
|---|---|---|---|---|
| 0 | VERSION ~1012 | VERSION NUMBER | PPM−>OPM | 16 |
| 2 | RESERVED ~1014 | RESERVED | N/A | 16 |
| 4 | CCI ~1016 | COMMAND STATUS AND CONNECTOR CHANGE INDICATION | PPM−>OPM | 32 |
| 8 | CONTROL ~1018 | CONTROL | OPM−>PPM | 64 |
| 16 | MESSAGE IN ~1020 | MESSAGE IN | PPM−>OPM | 128 |
| 32 | MESSAGE OUT ~1022 | MESSAGE OUT | OPM−>PPM | 128 |

FIG. 10

MULTIMODAL INTERFACE

CROSS-REFERENCE TO RELATED APPLICATION(S)

This Application is a national stage application under 35 U.S.C. § 371 of PCT Application PCT/US2016/02334200, filed Mar. 21, 2016 and entitled "Multimodal Interface", which application claims the benefit of and priority to Indian Non-Provisional Patent Application No. 2004/CHE/2015 filed 18 Apr. 2015 entitled "MULTIMODAL INTERFACE", which is incorporated herein by reference in its entirety. The disclosures of the prior applications are considered part of and are hereby incorporated by reference in their entirety in the disclosure of this application.

TECHNICAL FIELD

This disclosure relates in general to the field of electronic devices, and more particularly, to a multimodal interface.

BACKGROUND

End users have more electronic device choices than ever before. A number of prominent technological trends are currently afoot (e.g., more computing devices, more detachable displays, more peripherals, etc.), and these trends are changing the electronic device landscape. One of the technological trends is to connect a multitude of devices to an electronic device. In many instances, each of the devices have single purpose unique connectors to connect the device to the electronic device and one connector may not operate or function as another connector. For example, a universal serial bus (USB) connector is different than a display High-Definition Multimedia Interface (HDMI) connector. Hence, there is a challenge in providing an electronic device that allows for a unified connector that can support multiple devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4A and 4B are a simplified timing flow diagram illustrating potential operations that may be associated with the communication system in accordance with an embodiment;

FIG. 10 is a simplified data structure table illustrating potential details that may be associated with the communication system in accordance with an embodiment;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
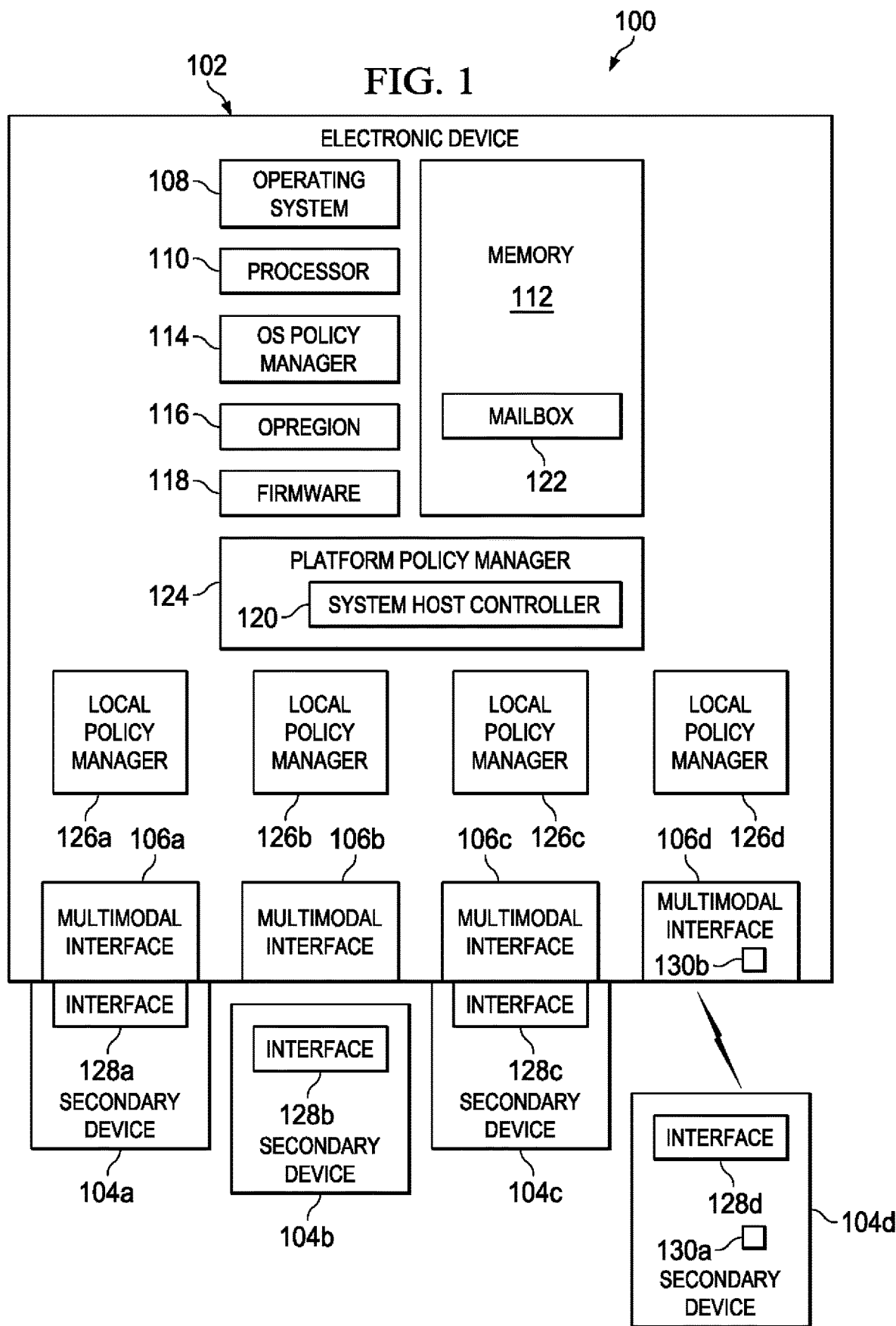
FIG. 1 is a simplified block diagram of an electronic device illustrating an embodiment of a communication system in accordance with an embodiment of the present disclosure.

FIG. 1 is a simplified block diagram of an embodiment of communication system 100 with a multimodal interface in accordance with an embodiment of the present disclosure. Communication system 100 can include an electronic device 102 and one or more secondary devices 104*a*-104*d*. Each secondary device 104*a*-104*c* can include an interface 128*a*-128*c* respectively. In an example, one or more secondary devices may include a wireless module to enable wireless communications. For example, secondary device 104*d* is illustrated as including a wireless module 130*a*.

Electronic device 102 can include an operating system (OS) 108, a processor 110, memory 112, an OS policy manager (OSPM) 114, operating region (opregion) 116, firmware 118, a platform policy manager (PPM) 124, one or more local policy managers (LPM) 126*a*-126*d*, and one or more multimodal interfaces 106*a*-106*d*. Memory 112 can include a mailbox 122. Mailbox 122 may be a buffer in memory 112. PPM 124 can include a system host controller 120. In an example, one or more multimodal interfaces can include a wireless module to enable wireless communications. For example, multimodal interface 106*d* is illustrated as including a wireless module 130*b*. In another example, wireless module 130*b* is included in electronic device 102 and its resources can be shared by a plurality of multimodal interfaces. Secondary device 104*d* can be in wireless communication with electronic device 102 using wireless modules 130*a* and 130*b*.

In an embodiment, each multimodal interface 106*a*-106*d* can have a corresponding LPM 126*a*-126*d*. For example, multimodal interface 106*a* may correspond to LPM 126*a*, multimodal interface 106*b* may correspond to LPM 126*b*, multimodal interface 106*c* may correspond to LPM 126*c*, and multimodal interface 106*d* may correspond to LPM 126*d*. Each multimodal interface 106*a*-106*d* may be a multimodal interface that can support power transfers, directionality, and multiple input/output (I/O) protocols on the same interface. The multiple protocols may be automatically configured to run either simultaneously or by themselves on the multimodal interface or connector without user intervention. For example, each secondary device 104a-104d may be a different electronic device and a single multimodal interface (e.g., one of multimodal interfaces 106a-106d) may be able to support each different secondary device 104a-104d.

Elements of FIG. 1 may be coupled to one another through one or more interfaces employing any suitable connections (wired or wireless), which provide viable pathways for communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the communication environment. The following foundational information may be viewed as a basis from which the present disclosure may be properly explained.

Current systems typically have single purpose connectors that support only one specific functionality such as a display connector, an audio connector, a power connector, etc. With users having more electronic device choices than ever before and a need to connect those device, what is needed is a unified connector that supports multiple functions on a single connector. It would be beneficial if the unified connector could be automatically configured and use the functionality of a multimodal connector on a platform independent of OS or I/O protocols.

To implement a solution where an OS can communicate with connected hardware, each connected hardware must communicate over a specific protocol to the underlying hardware. However, this is highly undesirable as the software driver needs to be specific to the OS and also requires the software driver to be customized to a platform port and device implementation. To enable a common solution for all OSs, a generic firmware based interface that allows an OS to interact with different types of hardware needs to be defined. The interface should not be developed specific to an OS which would increase the burden on original equipment manufacturer (OEM) enabling and negatively impacting the time to market readiness for new technology.

A communication system that includes a multimodal interface, as outlined in FIG. 1, can resolve these issues (and others). In communication system 100 of FIG. 1, each multimodal interface 106a-106d can be a multimodal interface or connector that can support power transfers, directionality, and multiple I/O protocols on the same interface or connector. The multiple protocols can be automatically configured to run either simultaneously or by themselves on the multimodal interfaces without user intervention. Communication system 100 can include a set of data structures, commands, notifications, and state transitions (both software and hardware) to efficiently configure and operate a platform with one or more multimodal interfaces or connectors. Communication system 100 can also communicate the capabilities of a platform to an OS that implements multimodal interfaces. I/O protocols can be configured to operate over the same or different pins on a multimodal interfaces.

The methodology can be defined in an OS (e.g., Android™, iOS™, Linux", OSX™, Windows™, etc.) and I/O interconnect (e.g., I2C™, I2S", PCIe™, etc.) agnostic fashion and as the data structures used to interface with multimodal interfaces in electronic device 102. As a result, hardware component designers, system builders, and device driver (software) developers, can develop platforms and devices with multimodal interfaces that seamlessly interoperate with one another. For example, PPM 124 can include a combination of hardware and firmware and any vendor provided OS support software that provides the interface to all the multimodal interfaces on the platform or electronic device. A specific interface (e.g., PCIe™, I2C™, etc.) is not required in order to interface with PPM 124. In addition, the interface between OSPM 114 and PPM 124 is defined in such a way as to be easily implemented using any of the above mentioned interconnects or any other interconnect not mentioned above.

Using PPM 124 and OSPM 114, communication system 100 can define a generic firmware based interface that abstracts the underlying hardware (e.g., Type C hardware), allowing the OS to access the hardware without knowing or understanding its specifications or intricacies. OSPM 114 is the interaction layer from OS 108 that abstracts the underlying platform specific hardware and is the platform agent that performs actual physical transactions with the hardware. Communication with the hardware (e.g., secondary devices 104a-104d) from OS 108 begins with OSPM 114 and passes through an LPM (e.g., LPM 126a) before reaching the hardware (e.g., secondary device 104a).

Firmware 118 may be a firmware based device policy manager that can be implemented by OEMs irrespective of the OS they need to support or the number of specific ports and devices on the platform or electronic device 102. This allows the development effort for OEMs to be reduced and allow for an accelerated time to market for new products, devices, and features. Firmware 118 and PPM 124 can abstract the underlying hardware from OS 108 to interact with LPM 126a-126d. LPMs 126a-126d do the actual command level communication with a secondary device (e.g., secondary devices 104a-104d) connected to a multimodal interface (e.g., multimodal interfaces 106a-106d).

Each multimodal interface 106a-106d can be an interface or connector with some minimal detection logic that interacts with an LPM 126a-126d respectively. Electronic device 102 can understand, control, or communicate with secondary devices 104a-104d through a connected LPM 126a-126d. Each LPM 126a-126d can physically be part of a SOC or can separately be on a platform concealed by other micro controllers (e.g., an embedded controller or an integrated sensor hub). Because PPM 124 provides an abstraction layer for communications between OS 108 and each secondary device 104a-104d, this allows for workarounds and bug fixes to be implemented at a platform level only without upper layer changes such as OS layer changes.

OSPM 114 is primarily responsible for communicating, to firmware 118, any OS 108 based requests or communications to secondary devices 104a-104d and vice versa. Firmware 118 can abstract the underlying hardware from OS 108 and OSPM 114 by interacting with PPM 124. PPM 124 is a platform specific component that maintains all (or almost all) platform and system level information on different secondary devices 104a-104d and directly communicates with each LPM 126a-126d that manage an individual multimodal interface 106a-106d. The communication mechanism between OSPM 114 and firmware 118 can work with almost any specific PPM 124. Firmware 118 can be implemented in multiple ways (including ACPI, SMM, etc.) such that firmware 118 can enable runtime communication with OSPM 114.

Communication between OSPM 114 and PPM 124 may go through mailbox 122. Mailbox 122 can be a shared buffer in memory 112 or some other location in a memory 112 of electronic device 102. Mailbox 122 can be a shared memory generic data structure that is defined in a format based on interface specification registers for secondary devices 104a-104d that describe the registers and pattern of access to secondary devices 104a-104d. In a specific example, mailbox 122 can be shared memory that is defined in a format based on the USB Type C Software Interface specification registers which describe the registers and pattern of access to Type C hardware.

To avoid possible race condition between two successive commands from OS 108 and a secondary device (e.g., one of secondary devices 104a-104d), when the communication between OS 108 and the secondary device is a two way communication, mailbox 122 can be partitioned into two regions, each accessible only to either firmware 118 or OSPM 114. For example, mailbox 122 can be partitioned as a command and response area. In an example, OSPM 114 can write a request or command from OS 108 to a secondary device in an OSPM 114 part of mailbox 122. PPM 124 can read mailbox 122 to receive the request or command from OSPM 114. In case there is a communication alert from the secondary device to OSPM 114, PPM 124 can update mailbox 122 and alert OSPM 114, which then reads mailbox 122 to process the cause for the alert.

System host controller 120 may be an embedded controller (EC) used in client systems, a baseboard management (BM) controller used in server systems, an I2C™ controller used in tablet systems, an integrated sensor hub (ISH) that may be used in long term possible solutions, or some other similar system that facilitates communications to and from PPM 124. Firmware 118 can establish opregion 116 for a communication channel that is irrespective of the type of PPM 124. For example, when there is a request detected from OSPM 114, firmware 118 can update opregion 116 with the request and alert PPM 124. In one example, opregion 116 can help facilitate access to a shared area such as mailbox 122. More specifically, opregion 116 can define where the shared area is located in electronic device 102 so that firmware 118 can update or retrieve the data in the shared area using access information provided by opregion 116. In an illustrative example, PPM 124 can retrieve the request (e.g., a request or communication from OS 108), process it, and communicate the request to a secondary device (e.g., secondary device 104a) using a LPM (e.g., LPM 126a) and a multimodal interface (e.g., multimodal interface 106a) connected to the secondary device. Similarly, any request or communication from the secondary device can pass through a multimodal interface (e.g., multimodal interface 106a) and a LPM (e.g., LPM 126a) and be received by PPM 124. PPM 124 can update mailbox 122 with the request or communication and OSPM 114 may be notified of the update. OSPM 114 can retrieve the request or communication using firmware 118 that in turn communicates with PPM 124 using opregion 116 and mail box 122. In an example, any request or communication from the secondary device (or interface or LPM) is first updated in opregion 116 by PPM 124 before firmware 118 writes it to mailbox 122 and is read by OSPM 114.

In a specific example, when OSPM 114 is in an idle state, OSPM 114 may be waiting for a notification or request from OS 108, PPM 124, or some other element. From the idle state, OSPM 114 may send a command and enter into a wait for command completion state. For example, OSPM 114 may send a connector status update command to PPM 124 and wait for a response from PPM 124. If the command was a reset PPM command, then the command may result in notifications being disabled from OSPM 114 and PPM 124 can send a reset indicator to indicate the reset command was received.

While in the wait for command completion state, if PPM 124 responds with a busy indicator, OSPM 114 can delay completion of the command and return to the wait for command competition state. If PPM 124 responds with a busy indicator and OSPM 114 determines that the command needs to be canceled, OSPM 114 can enter into a cancel present command intermediate state, send a cancel command message, and return to the wait for command competition state.

Also, from the idle state, OSPM 114 may wait for a notification, in which case OPSM 114 remains in the idle state. If a connector change pending indication is set, then OSPM 114 may enter into an OPM process connector change intermediate state. From the OPM process connector change intermediate state, OSPM 114 can send an associated command and enter into an OPM wait for command completion state or acknowledge the connector change, send an acknowledgement command, and enter into a wait for acknowledge command indicator state. After PPM 124 has sent an acknowledgement command indicator to indicate the connector change as being completed, PPM 124 can move from the OPM wait for acknowledge command indicator state to the idle state.

Using communication system 100, an OS vendor can properly interoperate with a system that supports multimodal interfaces or connectors such as multimodal interfaces 106a-106d. This can allow OS vendors and operating hardware vendors (OHVs) to develop software and hardware that can interoperate seamlessly. This can also enable an original equipment manufacturer (OEM) or an OHV to deliver products to users and produce OS agnostic standardized hardware that will work seamlessly with various OSs, attached third party peripherals, and even to improve the capability of products to communicate with each other.

Turning to the infrastructure of FIG. 1, communication system 100 in accordance with an example embodiment is shown. The term "command" and "communication" as used herein, refers to the transfer of data. The term "data" as used herein, refers to any type of binary, numeric, voice, video, textual, or script data, or any type of source or object code, or any other suitable information in any appropriate format that may be communicated from one point to another in electronic devices and/or networks. In an example implementation, electronic device 102 and secondary devices 104a-104d are electronic elements, which are meant to encompass any suitable hardware, software, components, modules, or objects that facilitate the operations thereof, as well as suitable interfaces for receiving, transmitting, and/or otherwise communicating data or information. This may be inclusive of appropriate algorithms and communication protocols that allow for the effective exchange of data or information.

In regards to the internal structure associated with communication system 100, each of electronic device 102 and secondary devices 104a-104d can include memory elements for storing information to be used in the operations outlined herein. Each of electronic device 102 and secondary devices 104a-104d may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic device 102 and secondary devices 104a-104d may include software modules to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102 and secondary devices 104a-104d may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be an electronic element and includes, for example, desktop computers, laptop computers, mobile devices, personal digital assistants, smartphones, tablets, or other similar devices. Secondary devices 104a-104d may be secondary hardware such as a peripheral that is in communication with electronic device 102. The term "peripheral" as used herein, is generally defined as any auxiliary device such as a Universal Serial Bus (USB) flash drive, computer mouse, keyboard, speaker, microphone, etc. that connects to and works with an electrical device such as a computer in some way. One or more secondary devices 104a-104d may be the same type of device or each secondary device 104a-104d may be a different device.

Figure 2:
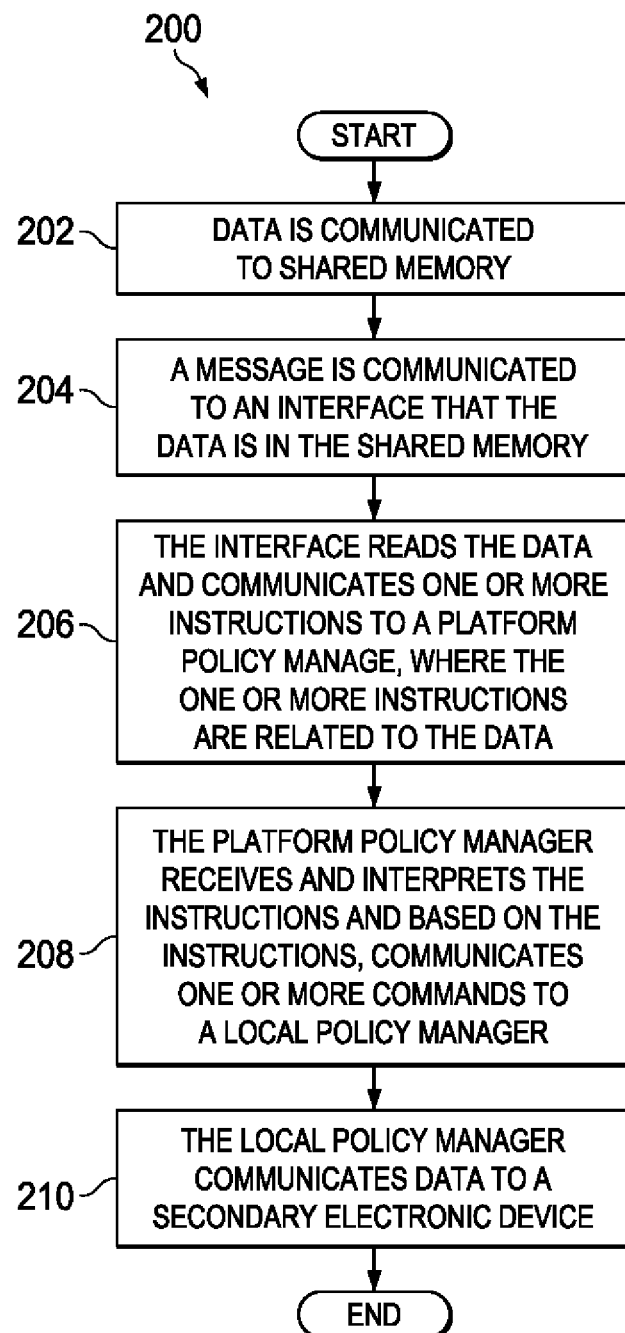
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with a multimodal interface, in accordance with an embodiment. In an embodiment, one or more operations of flow 200 may be performed by one or more of OSPM 114, PPM 124, and LPM 126a-126d. At 202, data is communicated to shared memory. For example, OS policy manager 114 may communicate data to mailbox 122. In another example, the data may be communicated to a register interface implemented in hardware where a data write operation could be used to trigger other operations. At 204, a message is communicated to an interface that the data is in the shared memory. For example, OS policy manager 114 may communicate a message to firmware 118 that data is in mailbox 122. At 206, the interface reads the data and communicates one or more instruction to a platform policy manager, where the one or more instructions are related to the data. For example, firmware 118 may read the data in mailbox 122 and can communicate one or more instructions related to the data to PPM 124. At 208, the platform policy manager receives and interprets the instructions and based on the instructions, communicates one or more commands to a local policy manager. For example, PPM 124 may interpret the instructions and communicate one or more instructions or commands to LPM 126a. At 210, the local policy manger communicates data to a secondary device. For example, LPM 126a may communication data to secondary device 104a using interface 128a and multimodal interface 106a.

Figure 3:
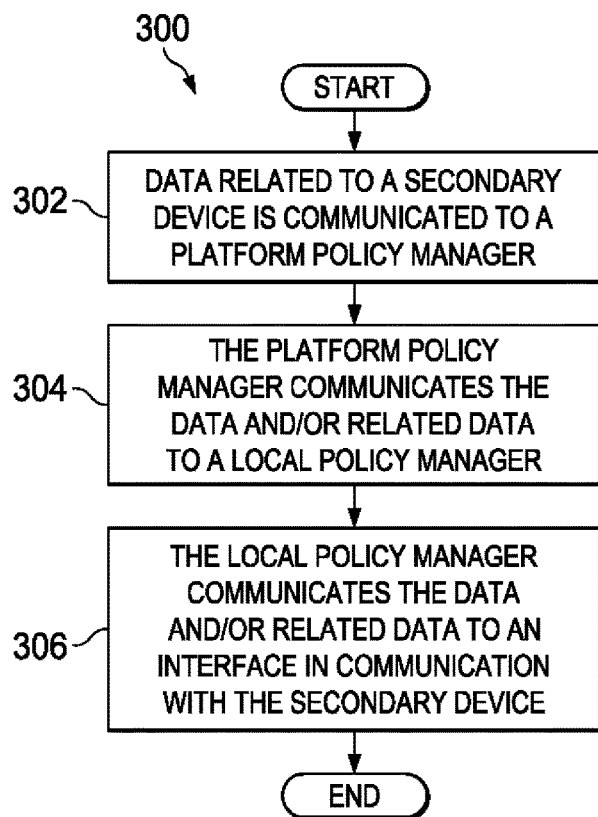
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with a multimodal interface, in accordance with an embodiment. In an embodiment, one or more operations of flow 300 may be performed by one or more of OSPM 114, PPM 124, and LPM 126a-126d. At 302, data related to a secondary device is communicated to a platform policy manager. For example, OSPM 114 may communicate data to PPM 124. The data may be communicated using mailbox 122 and firmware 118 or may be communication to PPM 124 using some other means. Further the data may be related to secondary device 104a and includes instructions, queries, commands, etc. for secondary device 104a. At 304, the platform policy manager communicates the data and/or related data to a local policy manager. For example, the data may be communicated from PPM 124 to LPM 126a. At 306, the local policy manager communicates the data and/or related data to an interface in communication with the secondary device. For example, the data may be communicated through LPM 126a and multimodal interface 106a to interface 128a in secondary device 104a.

Figure 4B:
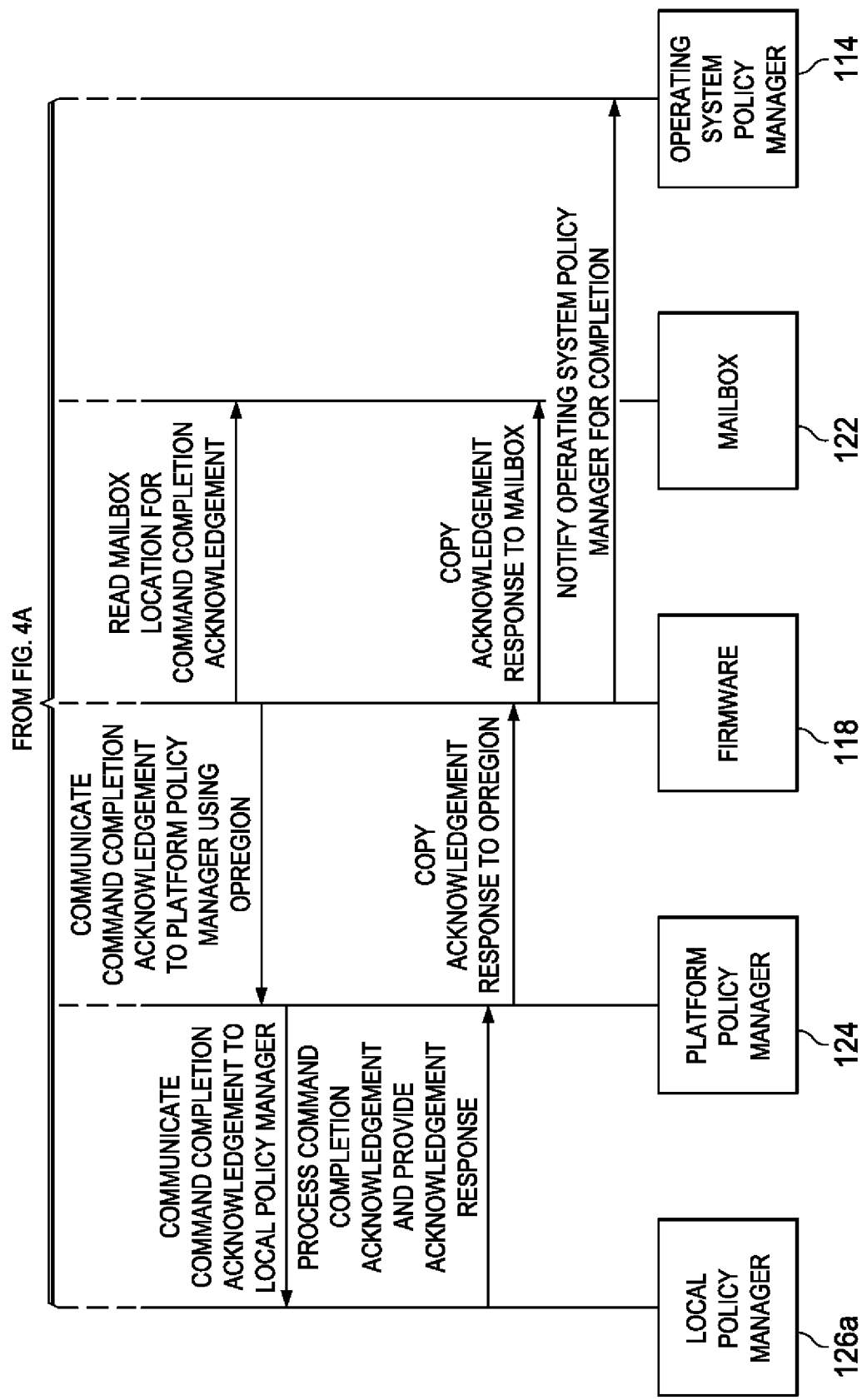

Turning to FIGS. 4A and 4B, FIGS. 4A and 4B are an example timing flow diagram illustrating possible operations that may be associated with a multimodal interface, in accordance with an embodiment. The timing flow diagram illustrates a regular synchronous flow from OSPM 114 to LPM 126a. LPM 126a can be in communication with secondary device 104a.

In an embodiment, OSPM 114 can communicate a write control command to mailbox 122. OSPM 114 can also send a notification of the mailbox write command to firmware 118. Firmware 118 can read mailbox 122 and acquire the command details. Firmware 118 can communicate the command details to PPM 124. In an example, the command details are communicated to PPM 124 using opregion 116. PPM 124 can communicate the command to LPM 126a. LPM 126a can execute the command and send a response back to PPM 124. For example, the command may be a communication or query to secondary device 104a. PPM 124 can copy the response to firmware 118. In an example, the response can be copied to firmware 118 using opregion 116. Firmware 118 can receive the response and copy the response to mailbox 122. Firmware 118 can also notify OSPM 114 of the response in mailbox 122 and that the command has been completed. OSPM 114 can write a command completion acknowledgement to mailbox 122 and notify firmware 118 of the command completion acknowledgment in mailbox 122. Firmware 118 can read mailbox 122 for the command completion acknowledgement and acquire the command completion acknowledgement details. Firmware 118 can communicate the command completion acknowledgement details to PPM 124. In an example, firmware 118 can communicate the command completion acknowledgement details to PPM 124 using opregion 116. PPM 124 can communicate the command completion acknowledgement to LPM 126a. LPM 126a can process the command completion acknowledgement and send an acknowledgment response back to PPM 124. PPM 124 can copy the acknowledgment response to firmware 118. In an example, PPM 124 can copy the acknowledgment response to firmware 118 using opregion 116. Firmware 118 can obtain the acknowledgment response and copy the acknowledgment response to mailbox 122. Firmware 118 can also notify OSPM 114 of the acknowledgment response in mailbox 122.

Figure 5:
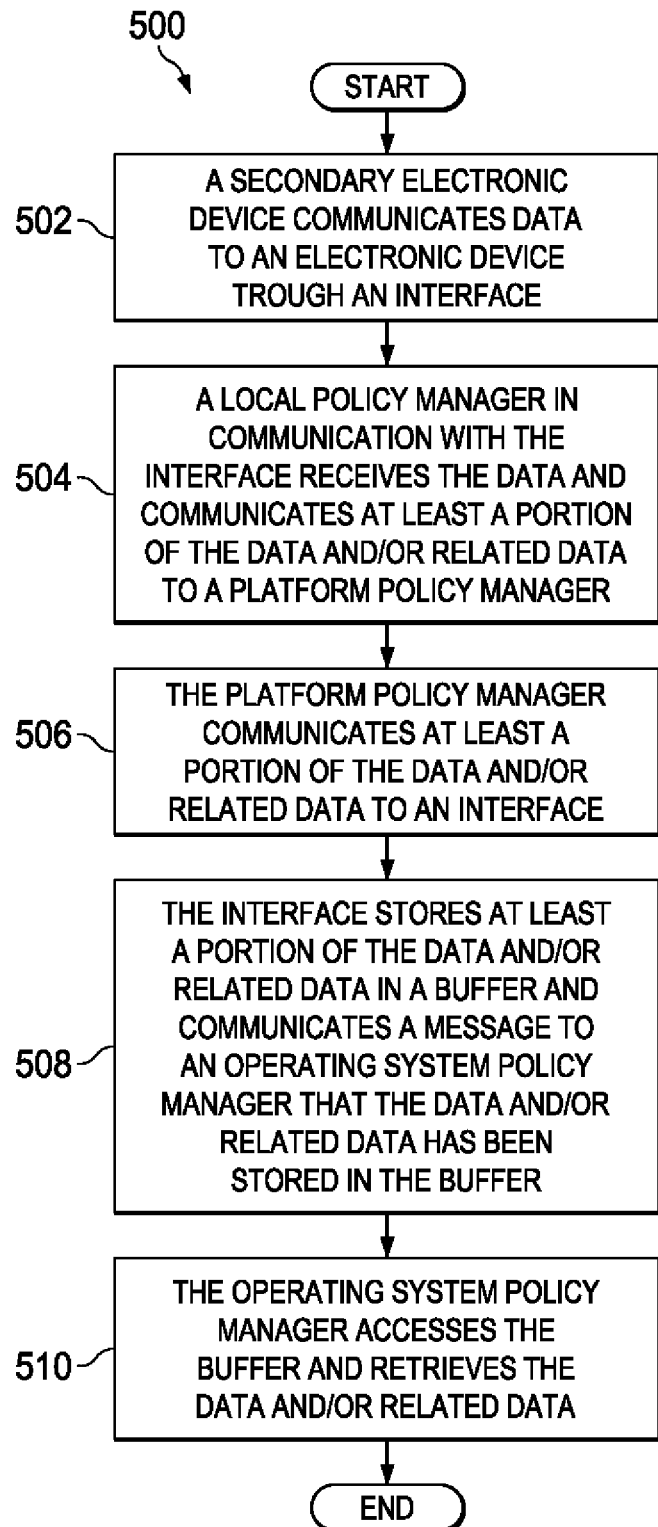
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with a multimodal interface, in accordance with an embodiment. In an embodiment, one or more operations of flow 500 may be performed by one or more of OSPM 114, PPM 124, and LPM 126a-126d. At 502, a secondary electronic device communicates data to an electronic device through an interface. For example, secondary device 104a may communicate data to electronic device using interface 128 and multimodal interface 106a. At 504, a local policy manager in communication with the interface receives the data and communicates at least a portion of the data and/or related data to a platform policy manager. For example, LPM 126a can receive the data from multimodal interface 106a and communicate the data to PPM 124. At 506, the platform policy manager communicates at least a portion of the data and/or related data to an interface. For example, PPM 124 may communicate at least a portion of the data to firmware 118. At 508, the interface stores at least a portion of the data and/or related data in a buffer and communicates a message to an operating system policy manager that the data and/or related data has been stored in the buffer. For example, firmware 118 may store the data and/or related data in mailbox 122 and communicate a message to OSPM 114 that the data and/or related data has been stored in mailbox 122. At 510, the operating system policy manager accesses the buffer and retrieves the data and/or related data. For example, OSPM 114 can retrieve the data in mailbox 122 and communicate the data and/or related data to OS 188 for execution or processing.

Figure 6:
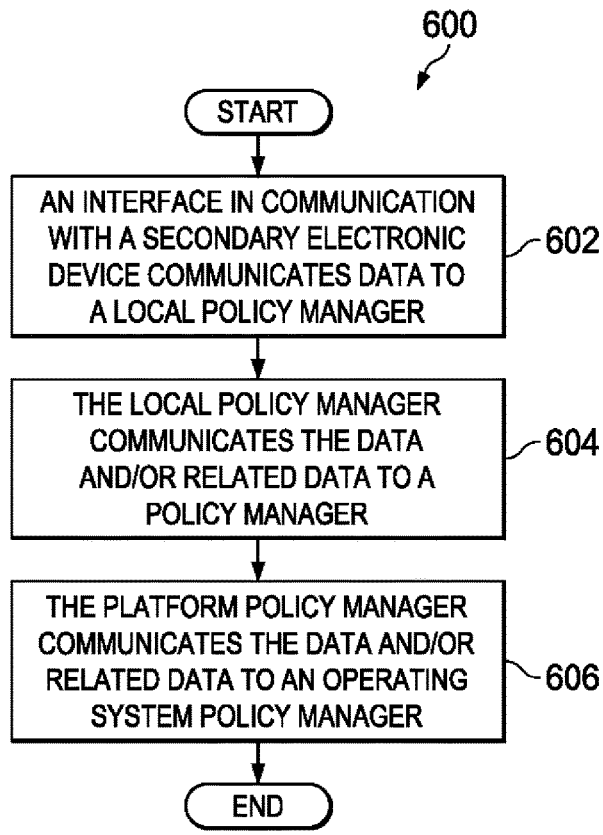
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with a multimodal interface, in accordance with an embodiment. In an embodiment, one or more operations of flow 600 may be performed by one or more of OSPM 114, PPM 124, and LPM 126a-126d. At 602, an interface in communication with a secondary electronic device communicates data to a local policy manager. For example, multimodal interface 106a may communicate data to LPM 126a. The data may have been received from secondary device 104a through interface 128, may have been a result of interface 128a being disconnected from multimodal interface 106a or some other communication or event. At 604, the local policy manager communicates the data and/or related data to a platform policy manager. At 606, the platform policy manager communicates the data and/or related data to an operating system policy manager. For example, PPM 124 may communicate the data and/or related data directly to OSPM 114, may communicate the data and/or related data to OSPM 114 using firmware 118 and mailbox 122, or may communicate the data and/or related data to OSPM 114 using some other path or means.

Figure 7:
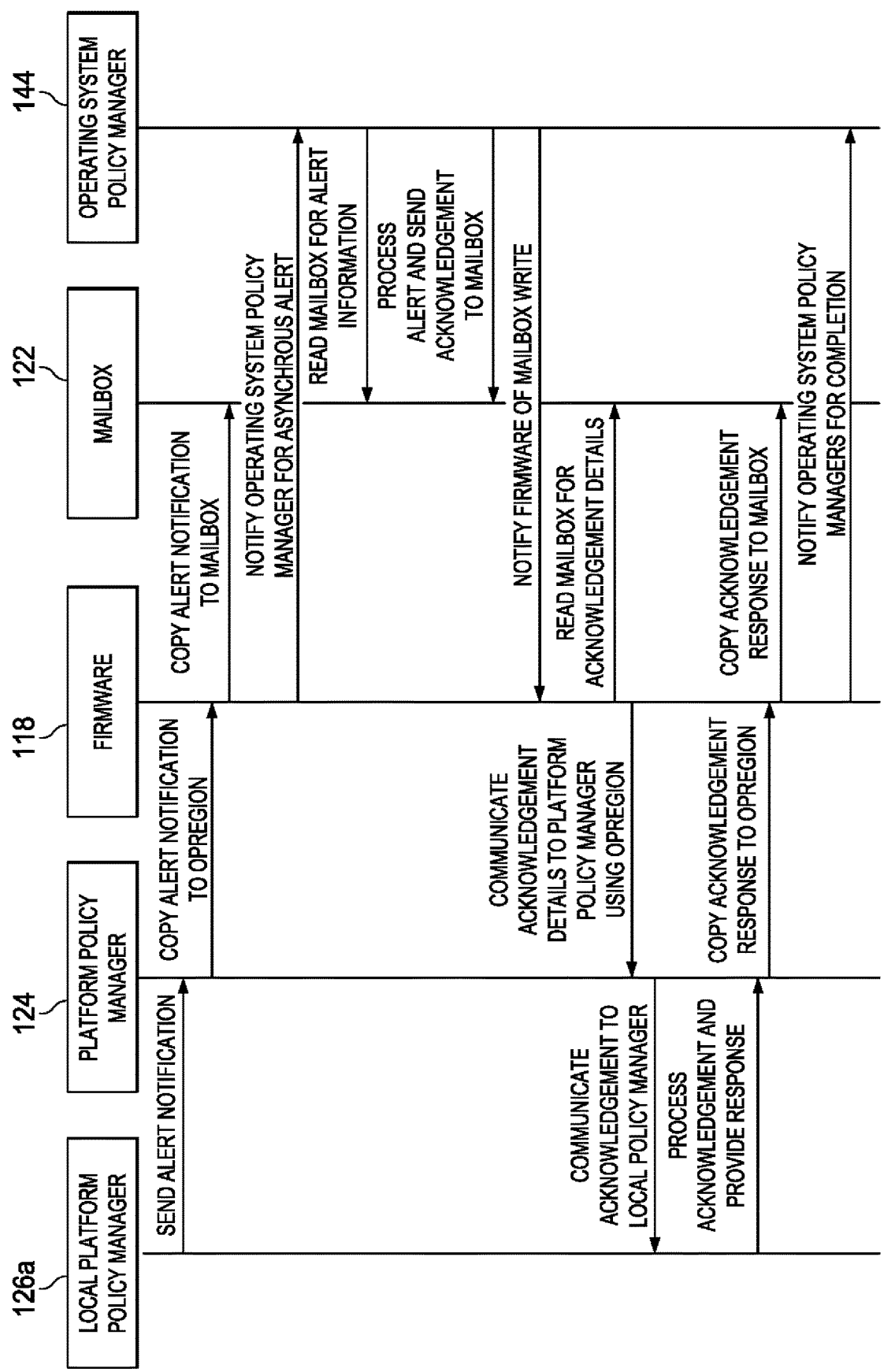
FIG. 7 is a simplified timing flow diagram illustrating potential operations that may be associated with the communication system in accordance with an embodiment.

Turning to FIG. 7, FIG. 7 is an example timing flow diagram illustrating possible operations that may be associated with a multimodal interface, in accordance with an embodiment. In an embodiment, an LPM 126a sends an alert notification to PPM 124. PPM 124 copies the alert to firmware 118. In an example, PPM 124 can copy the alert to firmware 118 using opregion 116. Firmware 118 copies the alert to mailbox 122 and firmware 118 notifies OSPM 114 of the alert. OSPM 144 reads the alert in mailbox 122 for information, processes the alert, and sends an acknowledgement to mailbox 122. OSPM 144 also sends a notification to firmware 118 that OSPM 144 has placed data in mailbox 122. Firmware 118 reads mailbox 122 for acknowledgement details and communicates the acknowledgment details to PPM 124. In an example, firmware 118 can communicate the acknowledgment details to PPM 124 using opregion 116. PPM 124 communicates acknowledgement details to LPM 126a and LPM 126a processes the acknowledgement details and provides a response to PPM 124. PPM 124 copies the acknowledgement response to firmware 118. In an example, PPM 124 can copy the acknowledgement response to firmware 118 using opregion 116. Firmware 118 places the acknowledgement response into mailbox 122. Firmware 118 notifies OSMP 144 of the acknowledgement response in mailbox 122.

Figure 8:
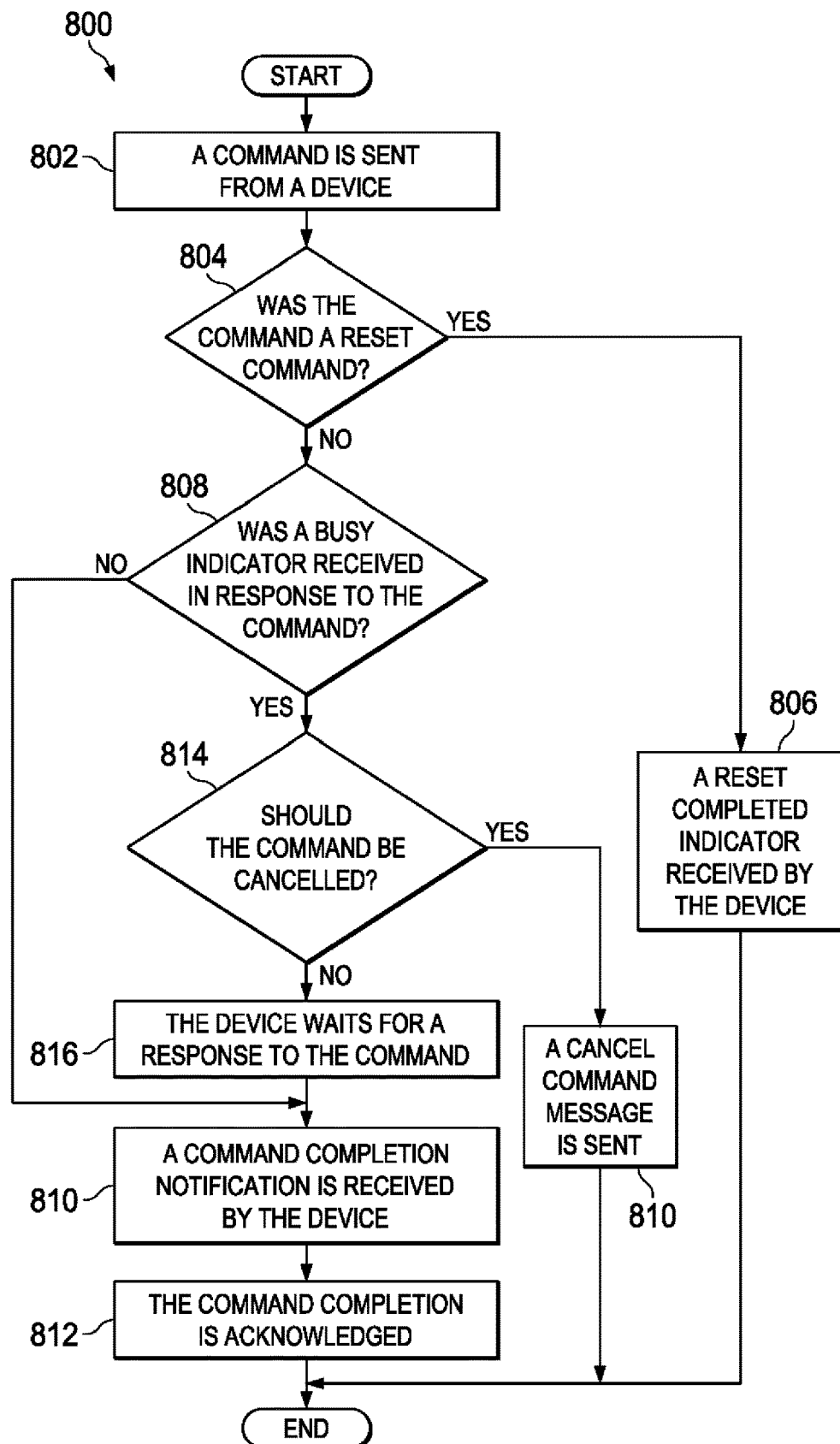
FIG. 8 is a simplified flowchart illustrating potential operations that may be associated with the communication system in accordance with an embodiment.

Turning to FIG. 8, FIG. 8 is an example flowchart illustrating possible operations of a flow 800 that may be associated with a multimodal interface, in accordance with an embodiment. In an embodiment, one or more operations of flow 800 may be performed by one or more of OSPM 114, PPM 124, and LPM 126a-126d. At 802, a command is sent from a device. At 804, the system determines if the command was a reset command. If the command was a reset command, then a reset completed indicator is received by the device, as in 806.

If the command was not a reset command, then the system determines if a busy indicator was received in response to the command, as in 808. If a busy indicator was not received in response to the command, then a command completion notification is received by the device, as in 810. At 812, the command completion is acknowledged. If a busy indicator was received in response to the command, then the system determines if the command should be cancelled, as in 814. If the command should be cancelled, then a cancel command message is sent, as in 810. If the command should not be cancelled, then the device waits for a response to the command, as in 816. At 810, a command completion notification is received and the command completion is acknowledged, as in 812.

Figure 9:
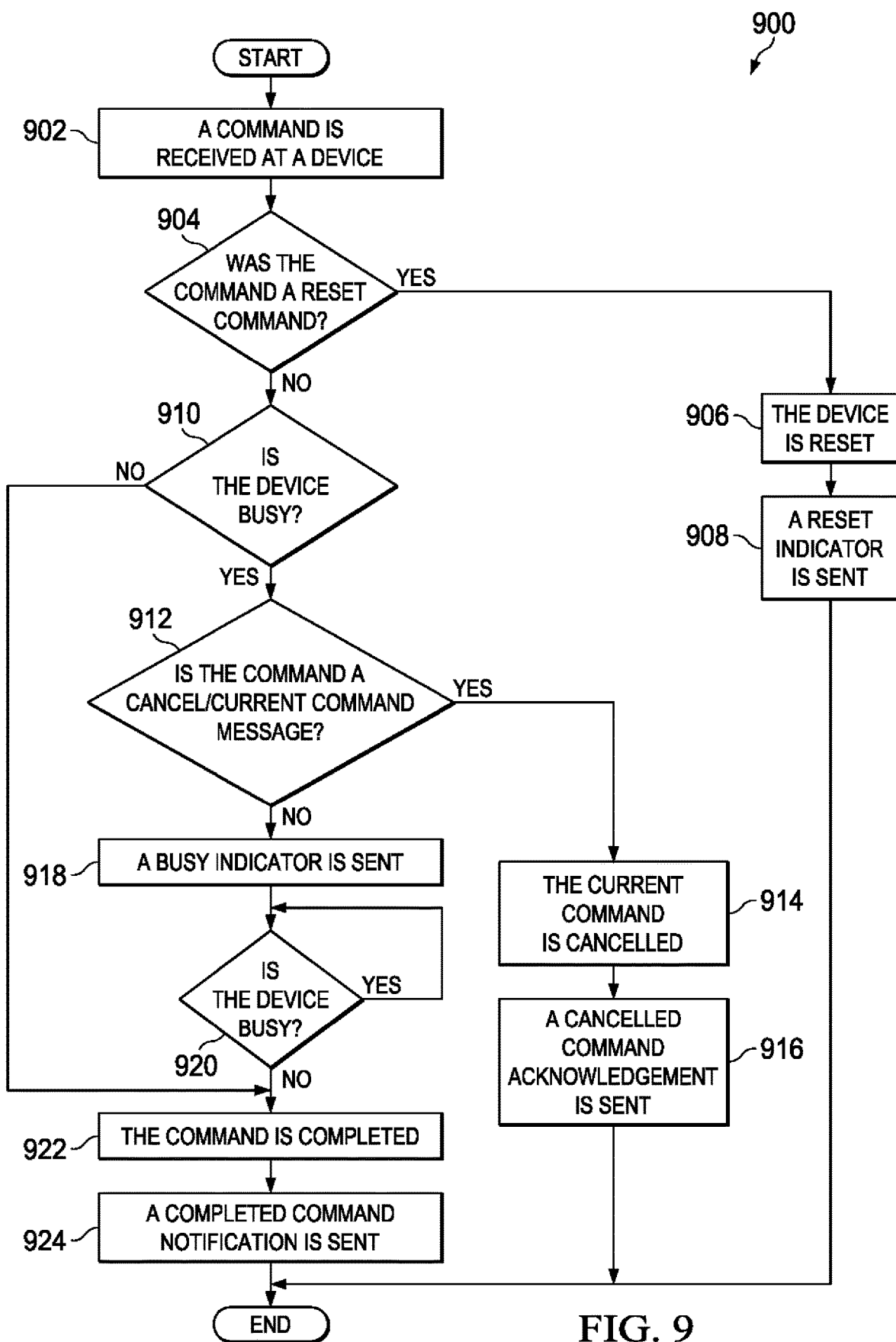
FIG. 9 is a simplified flowchart illustrating potential operations that may be associated with the communication system in accordance with an embodiment.

Turning to FIG. 9, FIG. 9 is an example flowchart illustrating possible operations of a flow 900 that may be associated with a multimodal interface, in accordance with an embodiment. In an embodiment, one or more operations of flow 900 may be performed by one or more of OSPM 114, PPM 124, and LPM 126a-126d. At 902, a command is received at a device. At 904, the system determines if the command was a reset command. If the command was a reset command, then the device is reset, as in 906. At 908, a reset indicator is sent.

If the command was not a reset command, then the system determines if the device is busy, as in 910. If the device is not busy, then the command is completed as in 922 and a completed command notification is sent, as in 924. If the device is busy, then the system determines if the command is a cancel current command message, as in 912. If the command is a cancel current command message, then the current command is cancelled, as in 914 and a cancelled command acknowledgement is sent, as in 916. If the command is not a cancel current command message, then a busy indicator is sent, as in 918. At 920, the system determines if the device is busy. If the device is busy, then the system checks again to see if the device is busy, as in 920. If the device is not busy, then the command is completed, as in 922 and a completed command notification is sent, as in 924.

Turning to FIG. 10, FIG. 10 is an example simplified data structure table 1000 illustrating possible details that may be associated with a multimodal interface, in accordance with an embodiment and is one example of a structure of the memory locations used to pass information between OSPM 114 and PPM 124 is illustrated in table 1000 of FIG. 10. In an embodiment, data structure table 1000 can include an offset column 1002, a name column 1004, a memory location column 1006, a direction column 1008, and a size column 1010. Name column 1004 can include the names of data structures for example, version 1012, reserved 1014, connector change indication (CCI) 1016, control 1018, message in 120, and message out 1022.

Direction column 1008 can include a direction in which each memory location may be used. For example, PPM→OPM indicates that PPM 124 uses the memory location to pass information to OSPM 114. The location is read only (RO) as far as OSPM 114 is concerned. Similarly OPM→PPM indicates that OSPM 114 uses the memory location to pass information to PPM 124. The location is RO as far as PPM 124 is concerned. Name column 1004 can include names of example data structures that may be used in communication system 100.

For example, version 1012 can include a version data structure. The version data structure can include a Binary-Coded Decimal (BCD) version to which PPM 124 is compliant. Reserved 1014 may be a reserved area of memory. CCI 1016 can include a CCI data structure. The CCI data structure can include the responses from the PPM 124 to commands sent to it by OSPM 114 as well as asynchronous status change notifications that occurred on multimodal interfaces 106a-106d. Control 1018 can include a control data structure. The control data structure can indicate the command to be executed by PPM 124. Message in 120 can include a message in data structure. The message in data structure can include the data that PPM 124 wants to send to OSPM 114. Message out 1022 can include a message out data structure. The message out data structure can include the data to be sent to PPM 124. The format of message in and message out data structures can be command specific.

In addition, various commands can be sent by OSPM 114 to PPM 124 to configure and operate multimodal interfaces 106a-106d. In one illustrative example, a command PPM reset can be used to reset PPM 124. The command PPM reset may be sent at any time by OSPM 114 to PPM 124. Upon receiving the command PPM reset, PPM 124 can perform a hard reset on each multimodal interfaces 106a-106d that is in communication with PPM 124. A cancel command can be used to cancel a command previously sent to PPM 124. A connector reset command can be used to reset multimodal interfaces 106a-106d. An acknowledge command completion and/or change indication can be used to communicate an acknowledgment to PPM 124 that OSPM 114 received and processed a command completion and/or a connector change indication. A set notification enable command can be used to set a list of asynchronous events that PPM 124 may send notifications about to OSPM 114.

A get capability command can be used to get the capabilities of PPM 124. A get connector capability can be used to get the capabilities of multimodal interfaces 106a-106d. A set operation mode can be used to set the operation mode that OSPM 114 wants for multimodal interfaces 106a-106d. For example, set operating mode can be used to set multimodal interface 106a to a specific USB operating mode.

A get alternate mode can be used to determine alternate modes that a secondary device (e.g., secondary device 104a) supports. A get connector alternate modes supported command can be used to determine a list of alternate modes that are supported on or by multimodal interfaces 106a-106d. A get current connector alternate mode command can be used to determine a current alternate mode that a multimodal interface (e.g., multimodal interface 106a) is operating in. A set new connector alternate mode command can be used to set a new alternate mode that OSPM 114 wants a multimodal interface (e.g., multimodal interface 106a) to operate in.

A get power delivery objects (PDOs) command can be used to get a sink or source PDO associated with a multimodal interface (e.g., multimodal interface 106a). A set power role command can be used to set a power transfer direction (either source or sink) of a multimodal interface (e.g., multimodal interface 106a). A get cable properties command can be used to get the properties of a cable or some other type of communication or data connector attached to a multimodal interface (e.g., multimodal interface 106a). A get connector status command can be used to get a current status (e.g., power role, data role, alternate modes configured, etc.) of a multimodal interface (e.g., multimodal interface 106a).

Upon PPM 124 initialization, PPM 124 is expected to function without any OS 108 interaction. On completion of internal initialization, PPM 124 can be in a PPM Idle (notifications disabled) state. PPM 124 may not notify OSPM 114 of any activity until OSPM 114 enables one or more notifications via a set notification enable command. On successful completion of the set notification enable command PPM 124 can transition to a PPM idle (notifications enabled) state. The only commands PPM 124 is required to process in the PPM idle (notifications disabled) state are set notification enable commands and PPM reset commands.

In an example operational model, OSPM 114 can send at most one command at a time to PPM 124. Once a command is sent, OSPM 114 must wait until PPM 124 completes the current command before sending the next command. PPM 124 can notify OSPM 114 when it completes the command if the command completed notification is enabled. The only exceptions to the one command rule are a cancel command and a PPM reset command. A PPM reset command may be sent by OSPM 114 at any time. The cancel command should only be sent by OSPM 114 when OSPM 114 wants to cancel an outstanding command that OSPM 114 had previously received a PPM busy response. Also, PPM 124 may send only one notification at a time to OSPM 114. PPM 124 can wait until OSPM 114 acknowledges the notification (due to an asynchronous event) before sending the next notification.

On reception of a command that is not a cancel command or a PPM reset command, PPM 124 can execute the command or set a busy indicator in a CCI data structure if PPM 124 is busy or PPM 124 will take more than a predetermined amount of time (e.g., 10 ms) to complete the command. Upon execution of the command, PPM 124 can set the CCI data structure and optionally update a status and message in data structure. If a command completed notification was enabled by OSPM 114 then PPM 124 can notify OSPM 114 of the completed command.

On receiving a cancel command, PPM 124 can cancel the current operation(s) it was performing or drop or ignore the cancel request if PPM 124 was not currently processing a command. If PPM 124 can complete the cancel command successfully, PPM can update the CCI data structure with the cancel completed indicator set to one. If the command completed notification was enabled by OSPM 114 then PPM 124 can notify OSPM 114 of the completed command.

On receiving a PPM reset command, PPM 124 can disable all notifications, reset itself and set the reset completed indicator in the CCI data structure, and transition to a PPM idle (notifications disabled) state. OSPM 114 can poll for the reset completed indicator in the CCI data structure. When an asynchronous event occurs on one or more of the connectors, PPM 124 can update the CCI and status data structures and notify OSPM 114 if the corresponding notification was enabled by OSPM 114. Once OSPM 114 is notified of either a command completion and/or an asynchronous event OSPM 114 can read the CCI and optionally the status data structures and acknowledge the notification via the acknowledge command completion and/or change indication command. If the event was an asynchronous event, then OSPM 114 can send any other commands it needs to get details on the asynchronous event.

Figure 11:
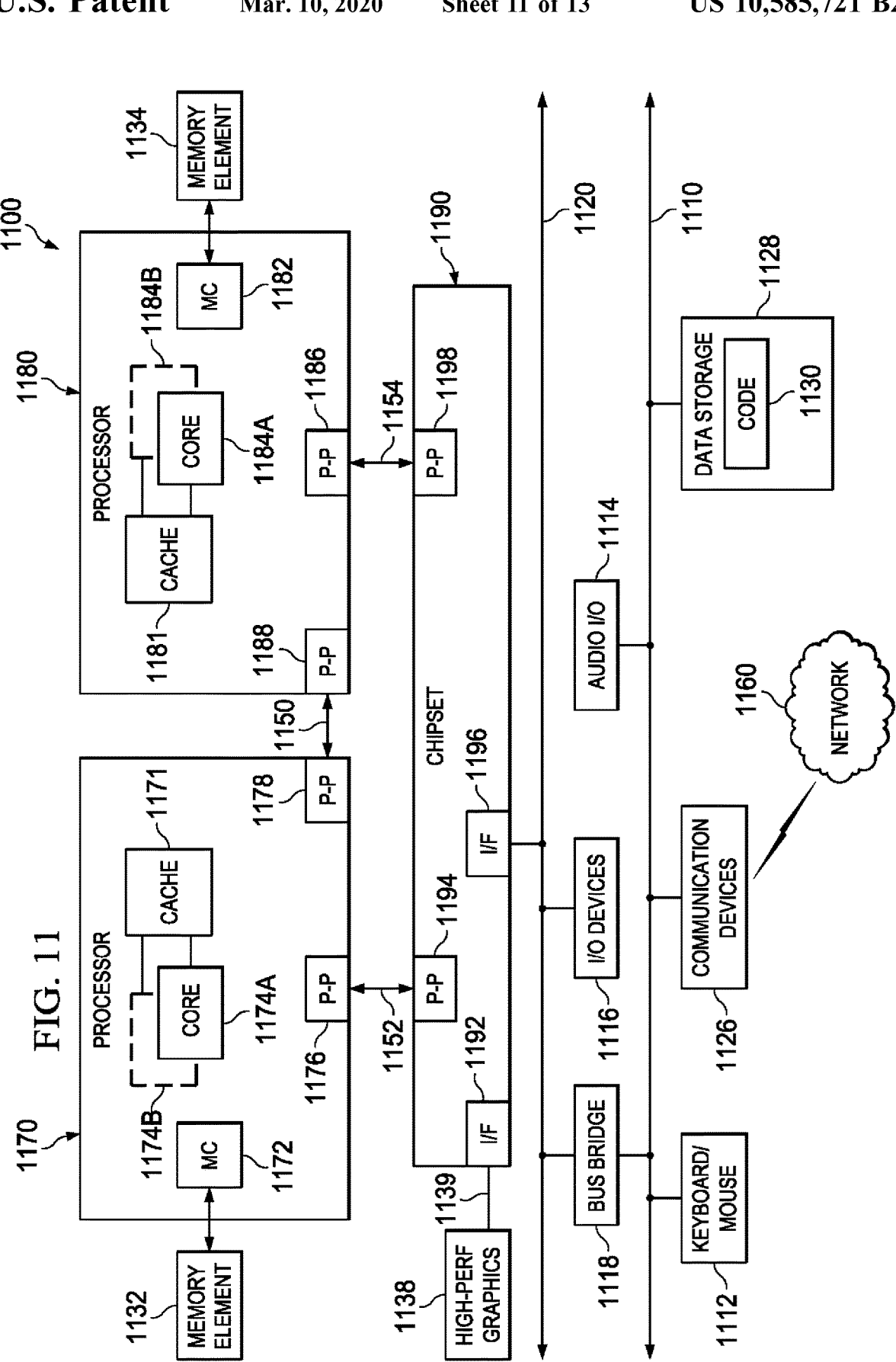
FIG. 11 is a block diagram illustrating an example computing system that is arranged in a point-to-point configuration in accordance with an embodiment.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the network elements of communication system 100 may be configured in the same or similar manner as computing system 1100.

As illustrated in FIG. 11, system 1100 may include several processors, of which only two, processors 1170 and 1180, are shown for clarity. While two processors 1170 and 1180 are shown, it is to be understood that an embodiment of system 1100 may also include only one such processor. Processors 1170 and 1180 may each include a set of cores (i.e., processor cores 1174A and 1174B and processor cores 1184A and 1184B) to execute multiple threads of a program. The cores may be configured to execute instruction code in a manner similar to that discussed above with reference to FIGS. 2-10. Each processor 1170, 1180 may include at least one shared cache 1171, 1181. Shared caches 1171, 1181 may store data (e.g., instructions) that are utilized by one or more components of processors 1170, 1180, such as processor cores 1174 and 1184.

Processors 1170 and 1180 may also each include integrated memory controller logic (MC) 1172 and 1182 to communicate with memory elements 1132 and 1134. Memory elements 1132 and/or 1134 may store various data used by processors 1170 and 1180. In alternative embodiments, memory controller logic 1172 and 1182 may be discrete logic separate from processors 1170 and 1180.

Processors 1170 and 1180 may be any type of processor, and may exchange data via a point-to-point (PtP) interface 1150 using point-to-point interface circuits 1178 and 1188, respectively. Processors 1170 and 1180 may each exchange data with a control logic 1190 via individual point-to-point interfaces 1152 and 1154 using point-to-point interface circuits 1176, 1186, 1194, and 1198. Control logic 1190 may also exchange data with a high-performance graphics circuit 1138 via a high-performance graphics interface 1139, using an interface circuit 1192, which could be a PtP interface circuit. In alternative embodiments, any or all of the PtP links illustrated in FIG. 11 could be implemented as a multi-drop bus rather than a PtP link.

Control logic 1190 may be in communication with a bus 1120 via an interface circuit 1196. Bus 1120 may have one or more devices that communicate over it, such as a bus bridge 1118 and I/O devices 1116. Via a bus 1110, bus bridge 1118 may be in communication with other devices such as a keyboard/mouse 1112 (or other input devices such as a touch screen, trackball, etc.), communication devices 1126 (such as modems, network interface devices, or other types of communication devices that may communicate through a computer network 1160), audio I/O devices 1114, and/or a data storage device 1128. Data storage device 1128 may store code 1130, which may be executed by processors 1170 and/or 1180. In alternative embodiments, any portions of the bus architectures could be implemented with one or more PtP links.

The computer system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 12:
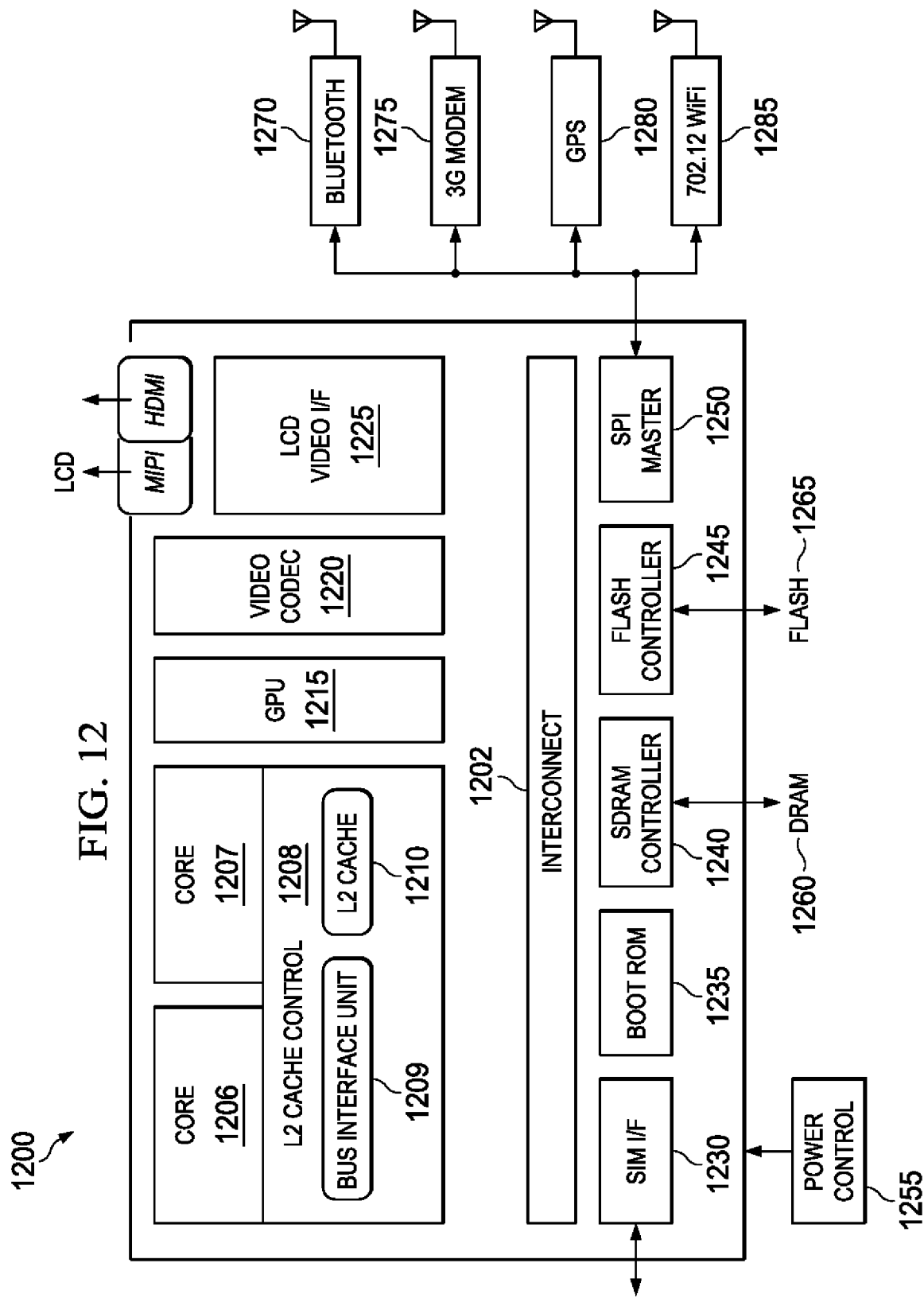
FIG. 12 is a simplified block diagram associated with an example ARM ecosystem system on chip (SOC) of the present disclosure.

Turning to FIG. 12, FIG. 12 is a simplified block diagram associated with an example ARM ecosystem SOC 1200 of the present disclosure. At least one example implementation of the present disclosure can include the multimodal interface features discussed herein and an ARM component. For example, the example of FIG. 12 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 12, ARM ecosystem SOC 1200 may include multiple cores 1206-1207, an L2 cache control 1208, a bus interface unit 1209, an L2 cache 1210, a graphics processing unit (GPU) 1215, an interconnect 1202, a video codec 1220, and a liquid crystal display (LCD) I/F 1225, which may be associated with mobile industry processor interface (MIPI)/high-definition multimedia interface (HDMI) links that couple to an LCD.

ARM ecosystem SOC 1200 may also include a subscriber identity module (SIM) I/F 1230, a boot read-only memory (ROM) 1235, a synchronous dynamic random access memory (SDRAM) controller 1240, a flash controller 1245, a serial peripheral interface (SPI) master 1250, a suitable power control 1255, a dynamic RAM (DRAM) 1260, and flash 1265. In addition, one or more embodiments include one or more communication capabilities, interfaces, and features such as instances of Bluetooth™ 1270, a 3G modem 1275, a global positioning system (GPS) 1280, and an 802.11 Wi-Fi 1285.

In operation, the example of FIG. 12 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 13:
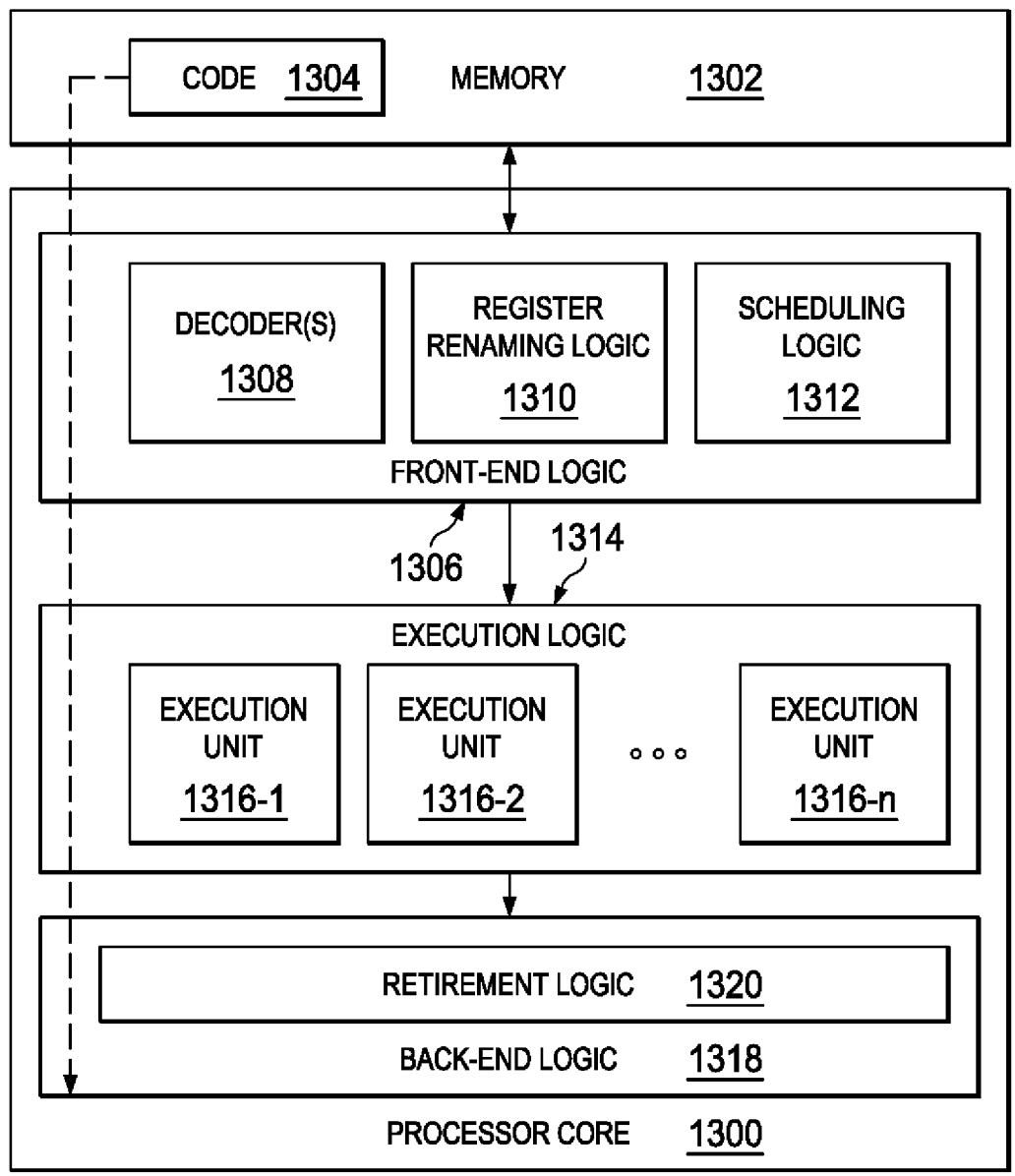
FIG. 13 is a block diagram illustrating an example processor core in accordance with an embodiment.

FIG. 13 illustrates a processor core 1300 according to an embodiment. Processor core 13 may be the core for any type of processor, such as a micro-processor, an embedded processor, a digital signal processor (DSP), a network processor, or other device to execute code. Although only one processor core 1300 is illustrated in FIG. 13, a processor may alternatively include more than one of the processor core 1300 illustrated in FIG. 13. For example, processor core 1300 represents an embodiment of processors cores 1174a, 1174b, 1184a, and 1184b shown and described with reference to processors 1170 and 1180 of FIG. 11. Processor core 1300 may be a single-threaded core or, for at least one embodiment, processor core 1300 may be multithreaded in that it may include more than one hardware thread context (or "logical processor") per core.

FIG. 13 also illustrates a memory 1302 coupled to processor core 1300 in accordance with an embodiment. Memory 1302 may be any of a wide variety of memories (including various layers of memory hierarchy) as are known or otherwise available to those of skill in the art. Memory 1302 may include code 1304, which may be one or more instructions, to be executed by processor core 1300. Processor core 1300 can follow a program sequence of instructions indicated by code 1304. Each instruction enters a front-end logic 1306 and is processed by one or more decoders 1308. The decoder may generate, as its output, a micro operation such as a fixed width micro operation in a predefined format, or may generate other instructions, microinstructions, or control signals that reflect the original code instruction. Front-end logic 1306 also includes register renaming logic 1310 and scheduling logic 1312, which generally allocate resources and queue the operation corresponding to the instruction for execution.

Processor core 1300 can also include execution logic 1314 having a set of execution units 1316-1 through 1316-N. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor core 1300 allows out of order execution but requires in order retirement of instructions. Retirement logic 1320 may take a variety of known forms (e.g., re-order buffers or the like). In this manner, processor core 1300 is transformed during execution of code 1304, at least in terms of the output generated by the decoder, hardware registers and tables utilized by register renaming logic 1310, and any registers (not shown) modified by execution logic 1314.

Although not illustrated in FIG. 13, a processor may include other elements on a chip with processor core 1300, at least some of which were shown and described herein with reference to FIG. 11. For example, as shown in FIG. 11, a processor may include memory control logic along with processor core 1300. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 2, 3, 5, 6, 8, and 9) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims;

and (b) does not intend, by any statement in the specification, to limit this disclosure in any way that is not otherwise reflected in the appended claims.

OTHER NOTES AND EXAMPLES

Example M1 is a method including receiving data from an operating system in an electronic device and communicating the data and/or related data to a local policy manager. The local policy manager can be in communication with the multimodal interface and the data can be related to hardware that is in communication with the electronic device through a multimodal interface.

In Example M2, the subject matter of Example M1 can optionally include where the multimodal interface is configured to support power transfers, directionality, and multiple input/output (I/O) protocols on the same interface.

In Example M3, the subject matter of any one of the Examples M1-M2 can optionally where the received data passed through firmware before it was received.

In Example M4, the subject matter of any one of the Examples M1-M3 can optionally where the received data was written to an operating region by the firmware before it was received.

In Example M5, the subject matter of any one of the Examples M1-M4 can optionally include where the received data was stored in shared memory before it was received.

In Example M6, the subject matter of any one of the Examples M1-M5 can optionally include receiving response data from the local policy manager, where the response data is related to the hardware and communicating the response data and/or related response data to shared memory.

In Example M7, the subject matter of any one of the Examples M1-M6 can optionally include where the data is received at a platform policy manager and the platform policy manager is in communication with a plurality of local policy platform managers, where each of the plurality of local policy platform managers are in communication with different type of hardware.

In Example A1, an apparatus for communicating with a multimodal interface can include a platform policy manager configured to receive data from an operating system in an electronic device, where the data is related to hardware that is in communication with the electronic device through a multimodal interface and communicate the data and/or related data to a local policy manager, where the local policy platform manager is in communication with the multimodal interface.

In Example, A2, the subject matter of Example A1 can optionally include where the multimodal interface is configured to support power transfers, directionality, and multiple input/output (I/O) protocols on the same interface.

In Example A3, the subject matter of any one of Examples A1-A2 can optionally include where the received data passed through firmware.

In Example A4, the subject matter of any one of Examples A1-A3 can optionally include where the received data was written to an operating region by the firmware before it was received.

In Example A5, the subject matter of any one of Examples A1-A4 can optionally include where the received data was stored in shared memory before it was received.

In Example A6, the subject matter of any one of Examples A1-A5 can optionally include where the platform policy manager can be further configured to receive response data from the local policy manager, where the response data is related to the hardware and communicate the response data and/or related response data to shared memory.

Example C1 is at least one machine-readable storage medium having one or more instructions that when executed by at least one processor cause the at least one machine-readable medium to receive data from an operating system in an electronic device, where the data is related to hardware that is in communication with the electronic device through a multimodal interface and to communicate the data and/or related data to a local policy manager, where the local policy manager is in communication with the multimodal interface.

In Example C2, the subject matter of Example C1 can optionally include where the multimodal interface is configured to support power transfers, directionality, and multiple input/output (I/O) protocols on the same interface.

In Example C3, the subject matter of any one of Examples C1-C2 can optionally include where the received data passed through firmware.

In Example C4, the subject matter of any one of Examples C1-C3 can optionally include where the received data was written to an operating region by the firmware before it was received.

In Example C5, the subject matter of any one of Examples C1-C4 can optionally include where the received data was stored in shared memory before it was received.

In Example C6, the subject matter of any one of Example C1-05 can optionally include one or more instructions that when executed by at least one processor, cause the machine-readable medium to receive response data from the local policy platform, where the response data is related to the hardware and communicate the response data and/or related response data to shared memory.

Example S1 is a multimodal interface system for communicating with different types of hardware, the system including a platform policy manager configured for receiving data from an operating system in an electronic device, where the data is related to hardware that is in communication with the electronic device through a multimodal interface and communicating the data and/or related data to a local policy manager, where the local policy manager is in communication with the multimodal interface.

In Example S2, the subject matter of Example S1 can optionally include where the multimodal interface is configured to support power transfers, directionality, and multiple input/output (I/O) protocols on the same interface.

In Example S3, the subject matter of any of the Examples S1-52 can optionally include where the received data passed through firmware.

In Example S4, the subject matter of any of the Examples S1-53 can optionally include where the received data was written to an operating region by the firmware before it was received.

In Example S5, the subject matter of any of the Examples S1-54 can optionally include where the received data was stored in shared memory before it was received.

Example X1 is a machine-readable storage medium including machine-readable instructions to implement a method or realize an apparatus as in any one of the Examples A1-A6, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

The invention claimed is:

1. A method comprising:
receiving, at shared memory, data from an operating system in an electronic device, wherein the received data is associated with hardware that is in communication with the electronic device through a multimodal interface, wherein the hardware is abstracted from the operating system by a firmware;
communicating a message to the firmware that the data is in the shared memory;
reading, by the firmware, the data from the shared memory;
communicating, by the firmware, the data and/or instructions related to the data to a platform policy manager, wherein the received data passed through the firmware and was written to an operating region by the firmware before it was received by the platform policy manager, wherein the platform policy manager is in communication with a plurality of local policy managers, wherein each of the plurality of local policy managers manage an individual multimodal interface and are in communication with a different type of hardware; and
communicating, by the platform policy manager, the data and/or one or more commands related to the data to a specific local policy manager, wherein the specific local policy manager is in communication with the multimodal interface that is in communication with the hardware wherein the specific local policy manager performs command level communication with the hardware, wherein the shared memory has a data structure based on a specification associated with a type of the multimodal interface.

2. The method of claim 1, wherein the multimodal interface is configured to support power transfers, directionality, and multiple input/output (I/O) protocols on a same interface.

3. The method of claim 1, wherein a message was communicated to an interface that the data is in the shared memory after the received data was stored in shared memory.

4. The method of claim 1, further comprising:
receiving response data from the local policy manager, wherein the response data is associated with the hardware; and
communicating the response data and/or data related to the response data to the shared memory.

5. The method of claim 1, wherein communication between the operating system and the hardware is a two way communication and the shared memory is partitioned into two regions.

6. An apparatus for communicating with a multimodal interface, the apparatus comprising:
one or more processors;
an operating system;
shared memory, wherein the operating system stores data related to hardware in the shared memory and communicates a message to firmware that the data related to the hardware is in the shared memory, wherein the hardware is in communication with the operating system through the multimodal interface;
the firmware, wherein the firmware abstracts the hardware from the operating system and reads the data from the shared memory; and
a platform policy manager, wherein the platform policy manager is configured to:
receives the data and/or instructions related to the data from the firmware, wherein the received data passed through the firmware and was written to an operating region by the firmware before it was received by the platform policy manager, wherein the platform policy manager is in communication with a plurality of local policy managers, wherein each of the plurality of local policy managers manage an individual multimodal interface and are in communication with a different type of hardware; and
communicate the data and/or one or more commands related to the data to a specific local policy manager, wherein the specific local policy manager is in communication with the multimodal interface that is in communication with the hardware, wherein the specific local policy manager performs command level communication with the hardware, wherein the shared memory has a data structure based on a specification associated with a type of the multimodal interface.

7. The apparatus of claim 6, wherein the multimodal interface is configured to support power transfers, directionality, and multiple input/output (I/O) protocols on a same interface.

8. The apparatus of claim 6, wherein the platform policy manager can be further configured to:
receive response data from the local policy manager, wherein the response data is associated with the hardware; and
communicate the response data and/or data related to the response data to the shared memory.

9. The apparatus of claim 6, wherein communication between the operating system and the hardware is a two way communication and the shared memory is partitioned into two regions.

10. At least one non-transitory machine-readable medium comprising one or more instructions executed by at least one processor, cause the processor to:
receive, at shared memory, data from an operating system in an electronic device, wherein the received data is associated with hardware that is in communication with the electronic device through a multimodal interface, wherein the hardware is abstracted from the operating system;
communicate a message to firmware that the data is in the shared memory;
read, by the firmware, the data from the shared memory;
communicate, by the firmware, the data and/or instructions related to the data to a platform policy manager, wherein the received data passed through the firmware and was written to an operating region by the firmware before it was received by the platform policy manager, wherein the platform policy manager is in communication with a plurality of local policy managers, wherein each of the plurality of local policy managers manage an individual multimodal interface and are in communication with a different type of hardware; and
communicate, by the platform policy manager, the data and/or one or more commands related to the data to a specific local policy manager, wherein the specific local policy manager is in communication with the multimodal interface that is in communication with the hardware, wherein the specific local policy manager performs command level communication with the hardware, wherein the shared memory has a data structure based on a specification associated with a type of the multimodal interface.

11. The at least one machine-readable medium of claim 10, wherein the multimodal interface is configured to support power transfers, directionality, and multiple input/output (I/O) protocols on a same interface.

12. The at least one machine-readable medium of claim 10, further comprising one or more instructions that when executed by at least one processor, cause the machine-readable medium to:
   receive response data from the local policy manager, wherein the response data is related to the hardware; and
   communicate the response data and/or data related to the response data to the shared memory.

* * * * *